Oct. 24, 1944.　　　　A. F. HOPPE　　　　2,361,206
GOVERNOR
Filed Sept. 3, 1943

INVENTOR.
ARNOLD F. HOPPE,
Hood & Hahn
ATTORNEYS.

Patented Oct. 24, 1944

2,361,206

UNITED STATES PATENT OFFICE 2,361,206

GOVERNOR

Arnold F. Hoppe, Greensboro, Ind.

Application September 3, 1943, Serial No. 501,064

6 Claims. (Cl. 123—102)

The present invention relates to governors, primarily for internal combustion engines, and particularly intended for controlling the operation of such engines when installed to drive automotive vehicles. The invention constitutes an improvement upon the invention disclosed in my co-pending application Ser. No. 439,684, filed April 20, 1942, for a governor. The invention therein disclosed has been found to be highly efficient and in most respects entirely satisfactory when used in connection with the engines of heavy duty vehicles such as trucks and buses in which the ratio of engine power to vehicle weight is relatively low. However, when the governor of my said co-pending application is installed to control the engine of a passenger automobile, in which the ratio of engine power to vehicle weight is relatively high, it has been found that the said governor of my said co-pending application acts in such a fashion that its influence upon the engine is felt too suddenly by occupants of the vehicle, tending to produce sudden and jerky deceleration or acceleration.

Therefore, while the primary object of my invention is to produce an automatic governor operable to control the supply of motive fluid to an internal combustion engine or the like, and particularly to the power plant of an automotive vehicle, to limit the rate of operation of that power plant in response to variations in speed of a moving part of the vehicle, a further object of the invention is to provide an improvement upon the invention disclosed in my said co-pending application, of such character as to smooth out the operation of the governor when the same is installed to control the relatively high powered engine of a relatively low-weight vehicle, such as a privately owned passenger car.

Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Figure 1:
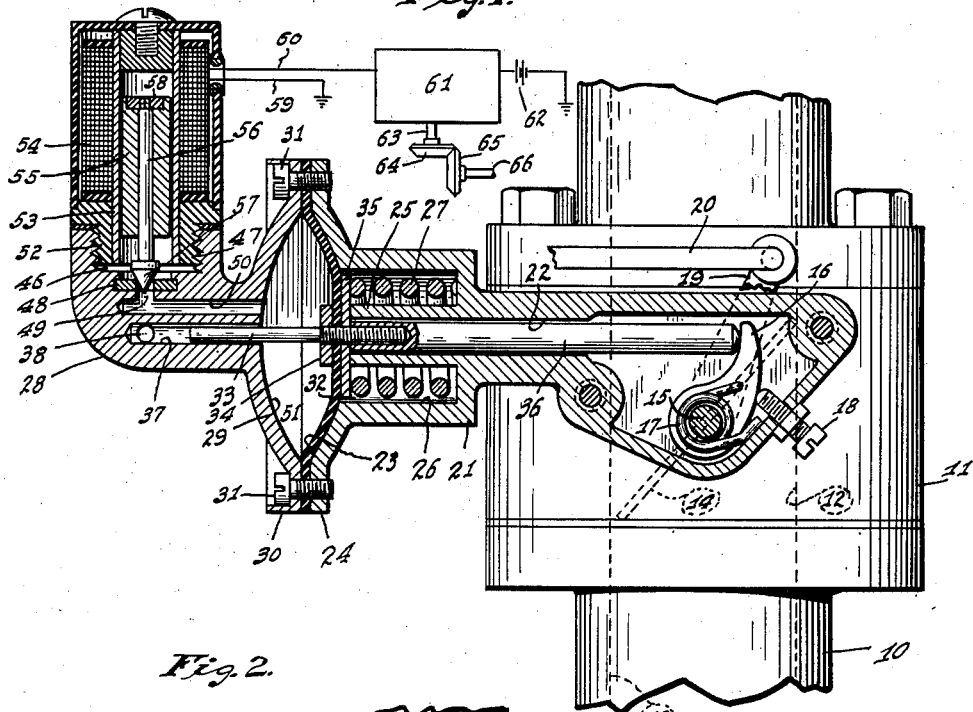
Fig. 1 is a fragmental elevation illustrating one manner of installation of my governor unit, and showing the unit itself in transverse section.
Figure 2:
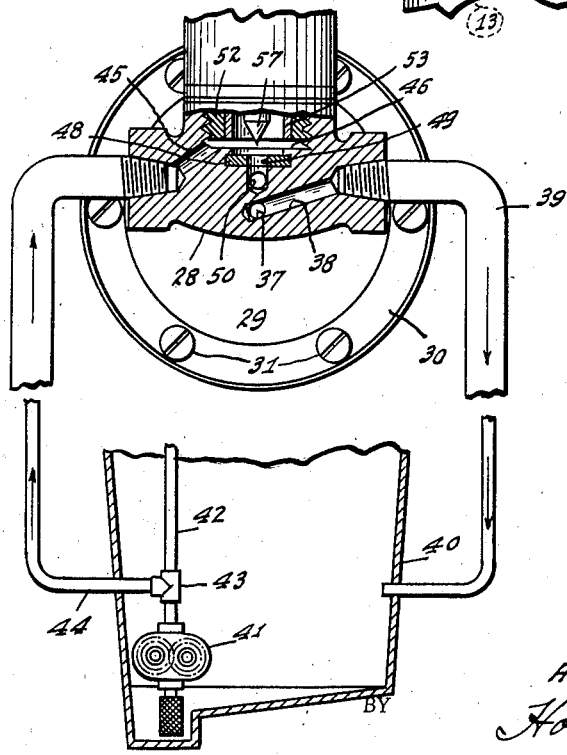
Fig. 2 is a partly diagrammatic view, showing the circulating system and certain details of the controlling means for the governor, illustrated in a section perpendicular to the plane of the section of Fig. 1.
Figure 3:
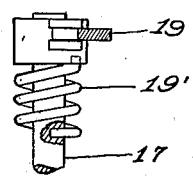
Fig. 3 is a fragmental plan of a detail.

I have indicated by the reference numeral 10 the fuel pipe through which mixed fuel flows from the carbureter of a combustion engine to the cylinder of such engine, but it is to be understood that the pipe 10 may alternatively represent the conduit for conducting any motive fluid to any type of engine. In the illustrated embodiment of the invention, there is inserted in the pipe 10 a unit 11 formed with a passage 12 therethrough registering with the passage 13 of the pipe 10. Mounted to control the flow of fluid through the passage 12 is a butterfly valve 14, which may be the standard throttle valve for the engine, or may be an auxiliary valve. In the illustrated embodiment of the invention, the valve 14 is the standard throttle valve. Said valve 14 is fixed to a shaft 15 journaled in the unit 11, and a lever 16 is likewise fixed to said shaft, a coiled spring 17, wrapped about the shaft 15, having one end connected to the lever 16 and its other end abutting against a suitable base, whereby said lever 16, and therefore the shaft 15 and valve 14, are resiliently urged toward counter-clockwise movement tending to open the passage 12. A set screw 18 is suitably mounted to limit the clockwise movement of the lever 16, to prevent complete closure of the passage 12, in accordance with standard practice.

I have shown a lever 19 mounted upon the shaft 17 and connected thereto by a spring 19', the connection being such that, when such motion is otherwise unresisted, swinging movement of the lever 19, to be controlled through a suitable rod 20, will be transmitted in either direction to the shaft 15.

A housing element 21 is formed with a shank having an axial bore 22 therethrough, and is suitably secured to the unit 11, said housing element preferably providing a portion enclosing the lever 16 and that portion of the shaft 15 upon which said lever is mounted. At its opposite end, the element 21 is formed to provide a concave bell 23 flanked by a perimetral flange 24. An annular flange 25 provides a continuation of the bore 22 within the chamber 26 formed in the element 21, and a spring 27 is received in said chamber 26, being coiled about the flange 25 for a purpose later to appear.

A second housing element 28 is formed at one end to provide a concave bell 29 adapted to mate with the bell 23 and flanked by a perimetral flange 30. The flange 30 is adapted to be connected to the flange 24, in mating relation, by screws 31, or other equivalent fastening means. A flexible diaphragm 32 is mounted with its body portion located within the chamber defined between the bells 23 and 29, and with its perimetral portion clamped between the flanges 24 and 30. It will be obvious that the diaphragm 32 is so mounted that its body portion may be shifted between the position illustrated and a position in which said body portion is substantially in engagement with the inner face of the bell 29. Thus the body portion of the diaphragm 32 forms the movable wall of a variable-volume chamber 51.

Penetrating the mid portion of the diaphragm body is a plunger 33 carrying a washer 34 abutting the left-hand surface of said diaphragm body. A second washer 35, preferably of greater extent, is mounted upon the protruding portion of the plunger 33 in engagement with the right-hand surface of the diaphragm body, so that it will be obvious that the washers 34 and 35 cooperate to support the plunger 33 upon the diaphragm body. Threadedly secured to the protruding end of the plunger 33 is another plunger 36 which is reciprocably mounted in the bore 22 of the first housing element 21, and which protrudes from said bore into cooperative relation with the end of the lever 16. The relationship between the diaphragm 32, plunger 36, and lever 16 is such that, when the diaphragm is in the position illustrated, the plunger 36 will positively hold the lever 16 in its extreme position of clockwise rotation, in which position the valve 14 is in its substantially closed position, in which it permits the passage of only so much motive fluid as is necessary to maintain the power unit in idling operation.

It will be seen that the spring 27 abuts the washer 35, thereby urging the diaphragm 32 toward its position in substantial contact with the inner face of the bell 29, which is the position of minimum volume of the chamber 51. When the diaphragm 32 is in the latter position, the plunger 36 will have been moved far enough to the left from its illustrated position to permit movement of the valve 14 to its full open position, in response to adjustment of the rod 20. But the parts are so proportioned that, when they are in the last-described positions, movement of the diaphragm 32 toward or to the position illustrated will cause the plunger 36 to engage the lever 16 to swing the same in a clockwise direction toward or to its illustrated position, thus tending to reduce the rate of flow of motive fluid through the passage 12.

The element 28 is formed to provide an exhaust conduit leading from the chamber 51, said conduit comprising a portion 37 which is coaxial or paraxial with the bore 22, and a portion 38 opening through a lateral branch of the element 28 and communicating with a conduit 39 which leads to a reservoir 40 which may be the crank case of the internal combustion engine. (Herein, I use the word "paraxial" to mean "parallel with the axis of.") I have illustrated said crank case and its associated parts quite diagrammatically. The reference numeral 41 indicates the usual oil pump mounted in the lower portion of the crank case 40, while the reference numeral 42 indicates the standard oil circulating conduit. Connected into that conduit 42 I have shown a T coupling 43 providing a branch conduit 44 which leads to the end of one portion 45 of an inlet conduit connecting said pump 41 with the chamber 51. In the specific embodiment illustrated, said inlet conduit portion 45 leads directly to a chamber 46 formed in the upper portion of the element 28, and internally threaded at 47 for a reason later to become apparent. Within the chamber 46 is provided a valve seat unit 48 formed with a port 49 leading to the portion 50 of the inlet conduit which communicates directly with the chamber 51.

A nipple 52 is threadedly received in the threaded portion 47 of the chamber 46 and supports a shell 53 which carries a solenoid coil 54 and which slidably receives the core 55 of said solenoid. Said solenoid core 55 is reciprocably slidable upon the stem 56 of a valve 57, said core being limited, in its movement with respect to said valve stem 56, by said head 57 and a stop washer 58 secured to the upper end of said stem. The valve 57 is adapted to seat upon, and close passage through, the valve seat 48, said valve being normally gravity-biased to passage-closing position. It will be obvious, however, that energization of the solenoid coil 54 will lift the core 55 to disengage the valve 57 from its seat 48 to open communication between the pump 41 and the chamber 51.

It will be perceived that the plunger 33 has a portion disposed, and slidably received, within the outlet conduit portion 37; and that the cross-sectional area of that portion of said plunger 33 is only slightly less than the cross-sectional area of the conduit portion 37. Thus, although the total cross-sectional area of the conduit portion 37 is substantially the same as that of the inlet conduit portion 50, so that said two passage portions may be formed by the same drill, the effective area of the conduit portion 37 is very greatly restricted, with relation to the effective area of the conduit portion 50.

Thus, when the valve 57 is open, fluid will flow into the chamber 51 very much more rapidly than it can escape therefrom.

I have illustrated an energizing circuit for the solenoid coil 54, comprising a wire 59 leading from ground to said coil, and a wire 60 leading from said coil through a speed responsive unit 61 and thence to one side of the usual storage battery 62, and so to ground. The speed responsive unit 61 may be a switch of any desired characteristics and including a rotor and switch mechanism adapted to be automatically closed when the rotor attains a predetermined, and preferably adjustable, rate of rotation. The rotor may be driven by a shaft 63 carrying a beveled gear 64 meshing with a beveled gear 65 upon a shaft 66 connected to any rotating element upon the vehicle. Thus, if the shaft 66 is connected to be driven by a rotating element somewhere between the engine and the transmission, it will be clear that the governor will be responsive to variations in engine speed; while, if the shaft 66 is connected to be driven by some element beyond the transmission, the governor will be responsive to variations in vehicle speed.

Assuming the parts to be in the positions illustrated in Fig. 1, it will be clear that the illustrated condition has arisen by the fact that the element 66 has attained the predetermined maximum speed for which the unit 61 has been set, whereby the valve 57 has been lifted from its seat and the diaphragm 32 has been forced into its illustrated position to close the valve 14, whereupon the critical speed has been reduced below the predetermined value, whereby the solenoid coil 54 has just been deenergized to permit the valve 57 to drop into conduit closing position. Now, the supply of liquid to the chamber 51 having been cut off, and the spring 27 tending to shift the diaphragm 32 to reduce the volume of the chamber 51, oil will flow, at a rate determined by the effective area of the conduit portion 37 as restricted by the plunger portion 33, through the conduit 37, 38, 39 to the reservoir 40, such flow being caused, of course, by movement of the diaphragm 32 toward the left under the influence of said spring 27. If the rod 20 is allowed to remain in its illustrated position, such movement of the diaphragm, accompanied by withdrawal of the plunger 36, will not affect the position of the valve 14, because the rod 20 will hold the lever 19 against movement from its illustrated position. But if the rod 20 is now moved, or has previously been moved, to a position farther to the left than the illustrated position, such retractile movement of the plunger 36 will be accompanied by counter-clockwise movement of the lever 16 and valve 14, under the influence of the spring 17, until the valve 14 attains the open or partially-open position for which the lever 19 has been set by the rod 20.

Movement toward the left of the diaphragm 32 will continue (assuming that the valve 57 remains closed) until the washer 34 comes into contact with the inner face of the bell 29.

If, now, the controlling element connected to drive the shaft 66 again attains a speed beyond that for which the unit 61 is set, solenoid coil 54 will again be energized and the valve 57 will again be opened. Oil, under the pressure generated by the pump 41, will thereupon flow through the conduit 44 and 45 to the chamber 46 and thence through the port 49 and passage 50 to the chamber 51. Since the effective area of the inlet conduit is materially greater than the effective area of the restricted outlet conduit, oil so supplied will accumulate in the chamber 51 under a pressure sufficient to overcome the tendency of the spring 27, whereby the diaphragm will be moved toward, and ultimately to, the position illustrated, thereby shifting the plunger 36 to the right and causing clockwise movement of the lever 16 and valve 14.

It will be clear that, in actual operation, if the lever 20 is held to a position such as to tend to hold the valve 14 open far enough to cause the speed of the shaft 66 to exceed, continuously, the predetermined maximum, the engine will continue to operate under the sole domination of the governor unit. That is, as the selected speed is slightly exceeded, the valve 57 will be opened to admit oil to the chamber 51. Oil will accumulate in that chamber relatively slowly because of the continuous bleeding of oil from the chamber through the restricted outlet conduit. As the valve 14 is moved by the plunger 36 toward closed position, the speed of the engine will be gradually reduced, whereby the speed of the shaft 66 will be correspondingly reduced; and as the speed of the shaft 66 falls below the predetermined speed, the coil 54 will be deenergized to permit closure of the valve 57. Immediately, the supply of oil to the chamber 51 is cut off, and the diaphragm 32 begins to move toward the left at a rate determined by the rate of bleed of oil from said chamber 51. Thus, the valve 14 will begin to open gradually, whereby the speed of the engine, and the speed of the shaft 66, will be gradually increased until the selected speed of the unit 61 is reached, whereupon the coil 54 will again be energized to open the valve 57, and the direction of movement of the diaphragm 32 will be reversed.

It has been found, in actual practice, that, under the conditions described, the engine speed will, after a few such fluctuations, vibrate so very slightly between a value just above the predetermined rate and one just below the predetermined rate that it will appear to the occupants of the vehicle that a constant speed is being maintained. In fact, tests indicate that the governor of the present application will cause the engine of an ordinary passenger car to maintain a more nearly uniform speed than can be maintained by the average driver, controlling vehicle speed through the use of the standard foot accelerator.

It is my present belief that the highly satisfactory results attained by the governor of the present application are due primarily to the use of liquid under pressure, as distinguished from compressible air, as the motive medium for the diaphragm, and to the concept of permitting the liquid, supplied at a relatively high rate to the chamber 51 when the valve 57 is open, to bleed from that chamber at a relatively low rate, under the influence of the relatively heavy spring 27.

I claim as my invention:

1. In a governor for the engine of an automotive vehicle, a fuel-delivery passage for said engine, a valve in said passage for controlling the flow of fuel therethrough, and means for controlling the position of said valve comprising a variable-volume chamber having a movable wall biased toward minimum-chamber-volume position, a source of liquid under pressure, a conduit connecting said liquid source with said chamber, a second valve controlling liquid flow through said conduit and biased toward flow-preventing position, a restricted exhaust conduit leading from said chamber, speed-responsive means operable to shift said second valve, at times, into flow-permitting position, and means providing an operative connection between said movable wall and said first-names valve for moving said first-named valve toward passage-closing position upon expansion of said chamber.

2. In a governor for the engine of an automotive vehicle, a fuel-delivery passage for said engine, a valve in said passage for controlling the flow of fuel therethrough, and means for controlling the position of said valve comprising a variable-volume chamber having a movable wall biased toward minimum-chamber-volume position, a source of liquid under pressure, a conduit connecting said liquid source with said chamber, a second valve controlling liquid flow through said conduit and biased toward flow-preventing position, a restricted exhaust conduit leading from said chamber, electric means operable, upon energization, to shift said second valve to flow-permitting position, speed-responsive means dominating an energizing circuit for said electric means and operable, at times, to close said circuit, and means providing an operative connection between said movable wall and said first-named valve for moving said first-named valve toward passage-closing position upon expansion of said chamber.

3. For use with a valve arranged to control the flow of fuel to the engine of an internal combustion engine, a variable-volume chamber having a movable wall, a source of liquid under pressure, a conduit connecting said source with said chamber, a second valve positioned to control flow through said conduit, a restricted passage for exhausting liquid from said chamber, means providing an operative connection between said movable chamber wall and said fuel-controlling valve to convert chamber-enlarging movement of said wall into flow-limiting movement of said valve, and means for operating said second valve.

4. For use with a valve arranged to control the flow of fuel to the engine of an internal combustion engine, a variable-volume chamber having a movable wall, means biasing said wall toward minimum-chamber-volume position, a source of liquid under pressure, a conduit connecting said source with said chamber, a second valve positioned to control flow through said conduit and biased toward closed position, a restricted passage for exhausting liquid from said chamber, means providing an operative connection between said movable chamber wall and said fuel-controlling valve to convert chamber-enlarging movement of said wall into flow-limiting movement of said valve, and means for opening said second valve.

5. In a device of the class described, a first housing element comprising a shank having a bore therethrough and further providing a concave bell at one end thereof flanked by a perimetral flange, a second housing element formed to provide a mating concave bell at one end thereof flanked by a corresponding perimetral flange, said second housing element being further provided with an inlet conduit and with an outlet conduit having a portion coaxial with said bore, a flexible diaphragm having its perimetral portion clamped between said flanges and its body portion positioned within the chamber defined by said bells, a plunger operatively connected to the body portion of said diaphragm and movable therewith, said plunger being reciprocably received in said bore, a second plunger operatively connected to the body portion of said diaphragm and movable therewith, said second plunger being coaxial with said first-named plunger and having a portion reciprocably received in said coaxial portion of said outlet conduit, the cross-sectional area of said second plunger being only slightly less than the cross-sectional area of said portion of said outlet conduit, a source of liquid under pressure communicating with said inlet conduit, and means for controlling liquid flow from said source through said inlet conduit to said chamber.

6. In a device of the class described, a first housing element comprising a shank having a bore therethrough and further providing a concave bell at one end thereof flanked by a perimetral flange, a second housing element formed to provide a mating concave bell at one end thereof flanked by a corresponding perimetral flange, said second housing element being further provided with an inlet conduit and with an outlet conduit having a portion coaxial with said bore, a flexible diaphragm having its perimetral portion clamped between said flanges and its body portion positioned within the chamber defined by said bells, a plunger operatively connected to the body portion of said diaphragm and movable therewith, said plunger being reciprocably received in said bore, spring means in said first housing element and urging said diaphragm body portion toward the bell of said second housing element, a second plunger operatively connected to the body portion of said diaphragm and movable therewith, said second plunger being coaxial with said first-named plunger and having a portion reciprocably received in said coaxial portion of said outlet conduit, the cross-sectional area of said second plunger being only slightly less than the cross-sectional area of said portion of said outlet conduit, a source of liquid under pressure communicating with said inlet conduit, and means for controlling liquid flow from said source through said inlet conduit to that portion of said chamber defined between the diaphragm and the bell of said second housing element.

ARNOLD F. HOPPE.